United States Patent
Pesola et al.

(10) Patent No.: US 7,007,152 B2
(45) Date of Patent: Feb. 28, 2006

(54) VOLUME TRANSLATION APPARATUS AND METHOD

(75) Inventors: Troy Raymond Pesola, Champlin, MN (US); Ravi K. Kavuri, Inver Grove Heights, MN (US); Michael W. Booth, Apple Valley, MN (US)

(73) Assignee: Storage Technology Corporation, Louisville, CO (US)

( * ) Notice: Subject to any disclaimer, the term of this patent is extended or adjusted under 35 U.S.C. 154(b) by 366 days.

(21) Appl. No.: 10/033,925

(22) Filed: Dec. 28, 2001

(65) Prior Publication Data

US 2003/0126327 A1    Jul. 3, 2003

(51) Int. Cl.
*G06F 13/00* (2006.01)

(52) U.S. Cl. .................. 711/202; 711/100; 711/112; 711/154

(58) Field of Classification Search .......... 711/100, 711/154, 200, 202, 206, 161, 162; 710/74; 714/8

See application file for complete search history.

(56) References Cited

U.S. PATENT DOCUMENTS

| | | | | |
|---|---|---|---|---|
| 3,976,982 A | | 8/1976 | Eiselen ................... 340/172.5 |
| 4,285,040 A | | 8/1981 | Carlson et al. ............. 364/200 |
| 4,805,090 A | * | 2/1989 | Coogan ....................... 710/74 |
| 5,018,095 A | * | 5/1991 | Nissimov ...................... 711/4 |
| 5,109,496 A | | 4/1992 | Beausoleil et al. .......... 395/400 |
| 5,239,659 A | * | 8/1993 | Rudeseal et al. .............. 714/6 |
| 5,297,124 A | * | 3/1994 | Plotkin et al. ............... 360/49 |
| 5,313,617 A | * | 5/1994 | Nakano et al. .............. 703/24 |
| 5,403,639 A | | 4/1995 | Belsan et al. .............. 395/600 |
| 5,446,854 A | | 8/1995 | Khalidi et al. .............. 395/401 |
| 5,572,661 A | * | 11/1996 | Jacobson ...................... 714/7 |
| 5,581,740 A | * | 12/1996 | Jones .......................... 703/25 |
| 5,608,865 A | | 3/1997 | Midgely et al. ............ 395/180 |
| 5,625,804 A | * | 4/1997 | Cooper et al. ................ 703/26 |
| 5,640,528 A | | 6/1997 | Harney et al. .............. 395/416 |
| 5,724,321 A | * | 3/1998 | Vishlitzky .................. 369/30.3 |
| 5,754,791 A | | 5/1998 | Dahlgren et al. ....... 395/200.72 |
| 5,771,354 A | | 6/1998 | Crawford ............... 395/200.59 |
| 5,793,385 A | | 8/1998 | Nale .......................... 345/515 |
| 5,815,664 A | | 9/1998 | Asano ................... 395/200.57 |
| 5,856,974 A | | 1/1999 | Gervais et al. ............. 370/392 |
| 5,878,270 A | * | 3/1999 | Kobayashi ..................... 710/1 |
| 5,901,228 A | | 5/1999 | Crawford ..................... 380/25 |
| 5,907,672 A | | 5/1999 | Matze et al. ........... 395/182.06 |
| 5,920,898 A | | 7/1999 | Bolyn et al. ................. 711/167 |
| 5,963,971 A | * | 10/1999 | Fosler et al. ................. 711/114 |

(Continued)

*Primary Examiner*—Tuan V. Thai
(74) *Attorney, Agent, or Firm*—Yee & Associates, P.C.

(57) ABSTRACT

A volume translation apparatus and method are provided. The volume translation apparatus resides between host machines and the physical storage devices accessed by the host machines. This volume translation apparatus may perform volume translation for the control path and optionally the data path of input/output (I/O) requests sent by the host machines to the physical storage devices. Control path translation ensures that the correct physical volumes are mounted for accessing by the I/O request. Because the physical volume may be different from that requested by the host machine application, the translation device includes a mapping that represents which physical volumes represent copies of the virtual volume used by the host machine application. When an I/O request is received and is directed to a particular original virtual volume, the volume mapping apparatus translates the original virtual volume identification into one or more physical volume identifications associated with a secondary virtual volume which may or may not be the same as the original virtual volume.

27 Claims, 6 Drawing Sheets

U.S. PATENT DOCUMENTS

| | | | |
|---|---|---|---|
| 5,964,848 A * | 10/1999 | Kikinis et al. | 710/2 |
| 6,055,236 A | 4/2000 | Nessett et al. | 370/389 |
| 6,144,999 A | 11/2000 | Khalidi et al. | 709/219 |
| 6,216,202 B1 * | 4/2001 | D'Errico | 711/112 |
| 6,240,527 B1 | 5/2001 | Schneider et al. | 714/21 |
| 6,263,421 B1 * | 7/2001 | Anderson | 712/209 |
| 6,269,431 B1 | 7/2001 | Dunham | 711/162 |
| 6,279,011 B1 | 8/2001 | Muhlestein | 707/204 |
| 6,295,575 B1 | 9/2001 | Blumenau et al. | 711/5 |
| 6,295,584 B1 | 9/2001 | DeSota et al. | 711/147 |
| 6,304,951 B1 * | 10/2001 | Mealey et al. | 711/206 |
| 6,336,172 B1 * | 1/2002 | Day et al. | 711/161 |
| 6,393,498 B1 * | 5/2002 | Hou et al. | 710/1 |
| 6,643,667 B1 * | 11/2003 | Arai et al. | 707/200 |
| 6,735,765 B1 * | 5/2004 | Schumacher | 717/164 |
| 6,874,046 B1 * | 3/2005 | LeCrone et al. | 710/74 |
| 2002/0114326 A1 * | 8/2002 | Mahalingaiah | 370/389 |
| 2002/0184516 A1 * | 12/2002 | Hale et al. | 713/200 |
| 2003/0101239 A1 * | 5/2003 | Ishizaki | 709/219 |
| 2003/0115432 A1 * | 6/2003 | Biessener et al. | 711/162 |

* cited by examiner

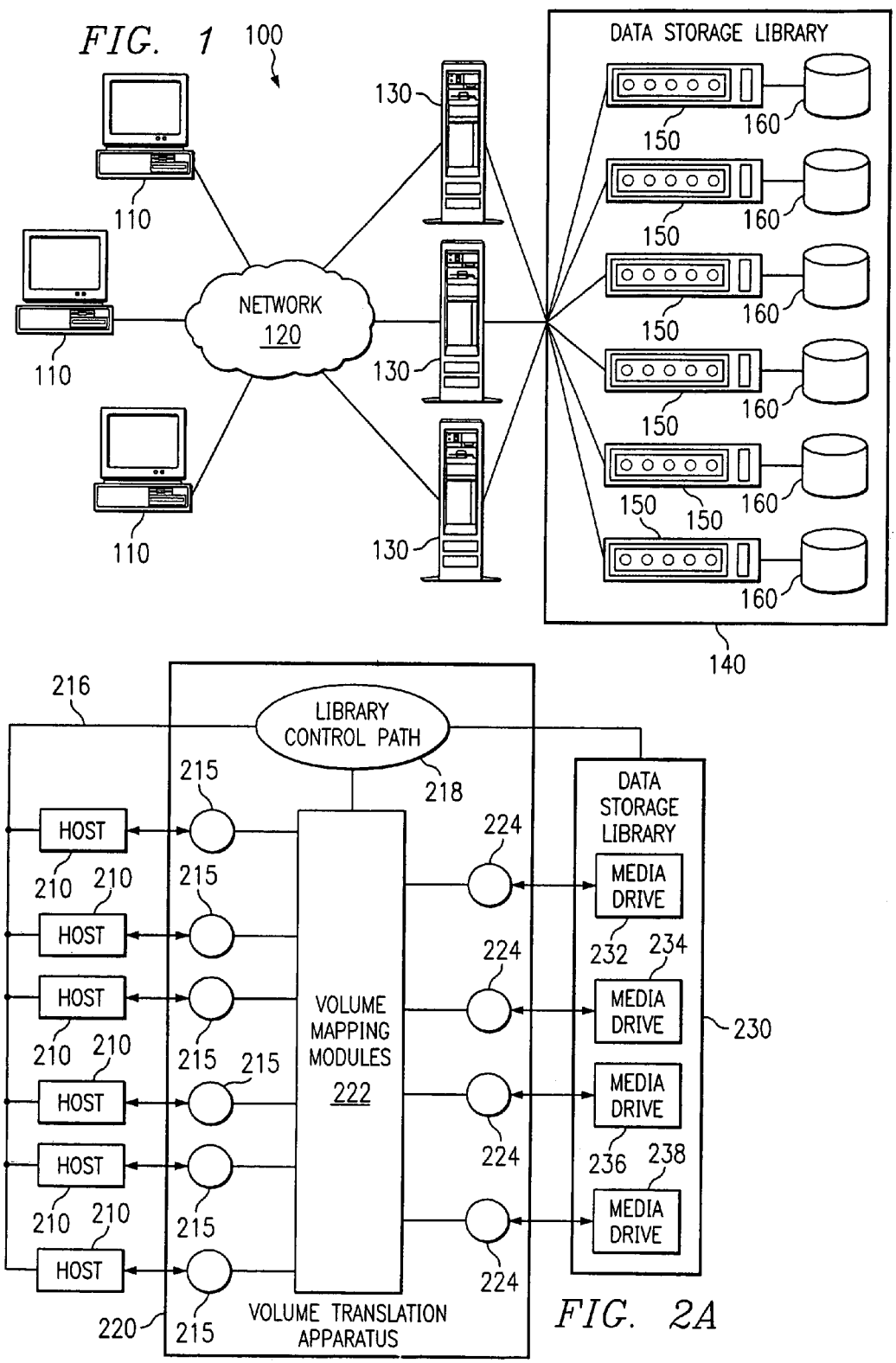

VOLUME TRANSLATION APPARATUS AND METHOD

TECHNICAL FIELD

The present invention is directed to an improved data processing apparatus. More specifically, the present invention is directed to a volume translation apparatus and method for data input/output operations.

DESCRIPTION OF RELATED ART

Disaster recovery often requires data to be replicated. Managing sets of replicated data is complex. It is not easy to make a new copy of the data and have the applications use this new copy of the data. When requesting data, the user traditionally must select one of a set of replicas to use. If and when errors are encountered, the user is required to manually select another replica and restart the process. Additionally, the application must maintain a list of replicas. Some applications require intervention if a physical volume with a different volume identifier than a standard volume identifier is specified. All of these factors cause the creation and maintaining of replicas to be a difficult endeavor.

Many mechanisms have been devised for the creation and maintenance of replicas of data. For example, U.S. Pat. No. 6,240,527 describes a mechanism for preserving time changes of data using point in time changes. The mechanism described in the '527 patent is directed to addressing managing historical changes of data on a volume.

Another mechanism, described in U.S. Pat. No. 5,608,865 discloses a server clustering mechanism in which different servers are substituted for application services in the event of an error. The mechanism described in the '865 patent requires a concurrent data storage model.

U.S. Pat. No. 5,901,228 discloses a mechanism for using virtual devices to translate from one media to another. The mechanism described in the '228 is directed to extending locally addressed storage over telecommunication links.

U.S. Pat. No. 6,269,431 discloses a mechanism for data addressing in staged storage where information is migrated to a secondary storage. With this mechanism, when requested, the data is automatically copied back to primary storage.

U.S. Pat. No. 6,144,999 discloses a similar mechanism as that described above with regard to U.S. Pat. No. 5,608,865. That is, a clustering mechanism is disclosed in which a concurrent data storage model is utilized.

Finally, U.S. Pat. No. 5,907,672 discloses a mechanism for improving the performance of backup and restore operations from disk media using tape media for an archive.

None of the prior art mechanisms provide for a translation method and apparatus that provides a transparent means to access identical information that resides on different virtual volumes. Moreover, none of the above prior art mechanisms provide for a translation method and apparatus that performs the translation directly, instead of first copying the data to a primary media. Thus, it would be beneficial to have an apparatus and method for transparent volume translation such that the host application need not change its input/output target virtual volume, yet different physical volumes may be accessed based on a mapping of the target virtual volume to a secondary virtual volume.

SUMMARY OF THE INVENTION

The present invention provides a volume translation apparatus and method. With the present invention, a volume translation apparatus resides between host machines and the physical storage devices accessed by the host machines. This volume translation apparatus performs volume translation for the control path and optionally the data path of input/output (I/O) requests sent by the host machines to the physical storage devices. Control path translation ensures that the correct physical volumes are mounted for accessing by the I/O request.

Because the physical volume may be different from that requested by the host machine application, the translation device includes a mapping that represents which physical volumes represent copies of the virtual volume used by the host machine application.

When an I/O request is received and is directed to a particular virtual volume, the volume mapping apparatus translates the virtual volume identification into one or more physical volume identifications. This translation may involve identifying a different set of physical volumes than the original set of physical volumes associated with the identified virtual volume. This may be due to a failure in the original set of physical volumes, a redirect to a replicated version of the virtual volume on a different type of data storage media or communication media, or the like. In this way, the translation is performed by an intermediate layer. This allows the host machine to continue to direct I/O requests to the same virtual volume even in the event of a failure of the original physical volumes or a redirection to a different media type.

With the present invention, the host machine applications need only track a single virtual volume and the volume translation apparatus manages which physical volumes contain the data on the virtual volume used by the application. When another copy, or replication, of the data is required, the data only needs to be copied with no additional processing. The volume translation apparatus need only be informed of the new copy and then it can be used by the host machine applications to access the data. The volume translation apparatus manages translating all references to the virtual volumes (media mounts and physical volume identifiers embedded in the media).

The volume translation apparatus may further be used to translate I/O requests to a different type of data storage media. With such an embodiment, the volume translation apparatus may present a first type of physical volume to the host machine, but use a different type of data storage media to actually store the data. For example, the data processing system may use disk storage to save copies of tape images. The volume translation apparatus may translate requests directly to commands to access the information on the physical data storage media being used.

The volume translation apparatus may further be used as a bridge to route between different types of storage networking medias. For example, the host machine could access the volume translation apparatus via a fibre channel communications link and the data may reside on a small computer system interface (SCSI) connected magnetic tape device.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is an exemplary block diagram of a data processing system according to the present invention;

FIG. 2A is an exemplary block diagram illustrating an operation of a volume translation apparatus according to one embodiment of the present invention;

DETAILED DESCRIPTION OF THE PREFERRED EMBODIMENTS

Figure 2B:
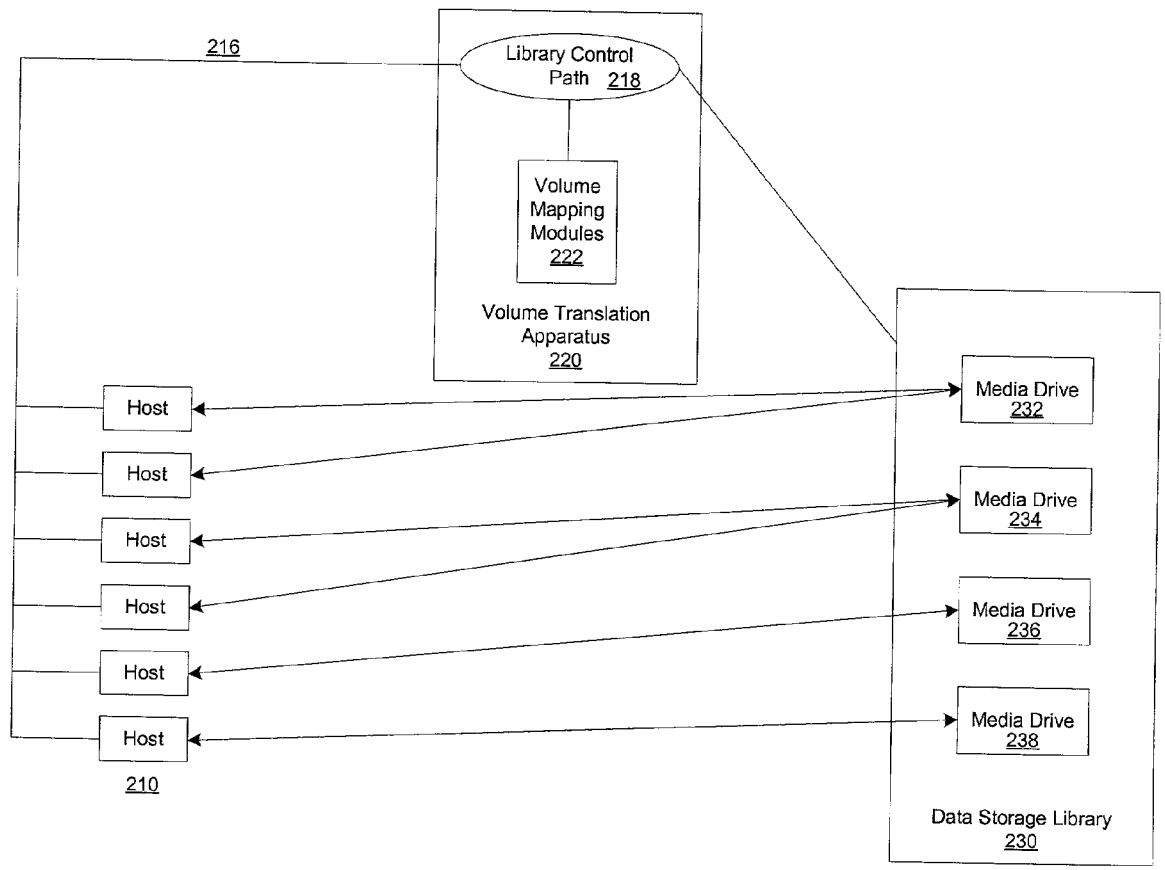
FIG. 2B is an exemplary block diagram illustrating an operation of a volume translation apparatus according to another embodiment of the present invention.

FIG. 1 is an exemplary block diagram of a data processing system according to the present invention. As shown in FIG. 17 a plurality of client devices 110 may access resources in a data storage library 140 via the network 120 and the servers, or host devices, 130.

Network data processing system 100 contains a network 120, which is the medium used to provide communications links between various devices and computers connected together within network data processing system 100. Network 120 may include connections, such as wire, wireless communication links, or fiber optic cables.

The client devices 110 may be, for example, personal computers, network computers, workstations, personal digital assistants (PDAs), mobile telephones having limited or full personal computer capabilities, or the like. In short, the client devices 110 may be any computerized device that is capable of sending/receiving data to/from the data storage library 140.

The network 120 may be any type of data network now known or later developed. For example, the network 120 may be a local area network (LAN), a wide area network (WAN), the Internet, an intranet, a wireless network, or the like. In a preferred embodiment, the network 120 is the Internet with network 120 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages.

The servers 130 provide a gateway and control access to the data storage library 140. The client devices 110 send input/output (I/O) access requests to the servers 130 in order to access data storage media in the data storage library 140. The servers 130 also facilitate the sending of data to the client devices 110 via the network 120. The servers 130 may perform many other functions based on the particular implementation and software resident on the servers 130.

In particular, the servers 130 may provide one or more applications that may be used by the client devices 110 to access the data storage media 160 of the data storage library 140. These applications may write to, or read from, the data storage media 160. As discussed hereafter, the present invention provides a mechanism to aid in the read/write operations performed by these applications.

The data storage library 140 includes a plurality of media drives 150 through which I/O operations may be performed on data storage media 160. The data storage media 160 may be any type of data storage media including magnetic tape, magnetic disks, floppy diskettes, CD-ROMs, DVD-ROMs, random access memory (RAM), memory cards, and the like. The media drives 150, likewise, may be of similar types including tape drives, diskette drives, hard drives, CD-ROM drives, DVD-ROM drives, memory card interfaces, optical media, and the like. It should be appreciated that each type of data storage media 160 and each type of media drive 150 may itself have different kinds of that type of media based on the vendor providing the data storage media 160 and media drive 150. In a preferred embodiment of the present invention, the data storage media 160 are magnetic tape media, the media drives 150 are magnetic tape drives, and the data storage library 140 is a magnetic tape library.

FIG. 1 is intended as an example, and not as an architectural limitation for the present invention. Modifications to the architecture shown in FIG. 1 may be made without departing from the spirit and scope of the present invention.

When an application on one of the servers 130 makes an I/O request, the I/O request is directed to a virtual volume. A virtual volume is a representation of a plurality of physical storage devices as a single storage device such that applications can read/write to a plurality of storage devices simply by read/writing to the virtual volume. The virtual volume is associated with one or more physical volumes on one or more of the data storage media 160. The data and parity information for the virtual volume may be written across a plurality of the data storage media 160.

In order to make sure the correct data is being read, or the correct data storage media are being written to, the servers 130 must maintain a correspondence between a virtual volume and the physical volumes on which the data for the virtual volume is stored. However, there may be times when the physical volumes of the virtual volume are not available, such as when a failure occurs.

In order to be able to handle failures of data storage media 160, or media drives 150, it is necessary to have the data stored on the data storage media 160 replicated. However, managing sets of replicated data is complex and it is not easy to make a new copy for the applications to use.

Typically, the host machines, e.g., servers 130, must maintain a record of the various replicated virtual volumes and the physical volumes associated with each replication of the virtual volumes. Thus, when a physical volume is not available, the physical volumes of a replication of the virtual volume may be mounted and accessed. This requires that the applications on the host machine modify their access requests to identify a different virtual volume, and thereby a different set of physical volumes, from the one that they typically identify. Such an approach requires that the host machine perform complex volume management functions and thus, uses many of the processors' processing cycles.

The present invention alleviates the burden on the host machines for performing complex volume management by inserting an additional layer of functionality between the host machine applications and the data storage library 140. This additional layer of functionality provides volume translation so that an I/O request to a virtual volume may have the I/O request redirected to a different set of physical volumes in the event that an original set of physical volumes is unavailable, without requiring the host machine's applications to direct the I/O request to this different set of physical volumes. In other words, the host machine's applications may still direct I/O requests to the same virtual volume regardless of whether the original set of physical volumes are being accessed or a different set of physical volumes are being accessed due to a failure. Thus, the actual physical volumes being accessed is transparent to the host machine's applications.

FIG. 2A is an exemplary block diagram illustrating an operation of a volume translation apparatus according to the present invention. As shown in FIG. 2A, a plurality of host machines 210, such as servers 130 in FIG. 1, may transmit I/O requests for execution on data storage media in the media drives 232–238 of data storage library 230. These I/O requests may include data that is transmitted across a data channel 215 to the volume translation apparatus 220 and control information transmitted across a control channel 216. While FIG. 2A illustrates the data and control channels 215 and 216 as separate communication links for clarity, in actuality the control information and data may be transmitted across the same physical connection.

The control information of the I/O requests includes information identifying the virtual volume to which the I/O request is directed. This control information is provided along the control channel 216 to the volume mapping modules 222.

The I/O requests are passed through the volume mapping modules 222 of the volume translation apparatus 220. The volume mapping modules 222 take the virtual volume identifier in the control information of the I/O request and map the virtual volume to a secondary virtual volume. This secondary virtual volume may be the same as the identified virtual volume, in the case of no fault in the physical volumes of the identified virtual volume, or may be a different virtual volume in the case that one or more physical volumes in the identified virtual volume are not available. This secondary virtual volume is then mapped to physical volumes associated with the secondary virtual volume.

After having mapped the identified virtual volume to an appropriate set of physical volumes, the control information for the I/O request is modified to identify the physical volumes of the secondary virtual volume. This control information may then be transmitted to the data storage library 230 along library control path 218 to ensure that the correct physical volumes are loaded into the media drives 232–238. The correct physical volumes are determined based on the maintenance of a record of physical volumes that are replicas of the target virtual volume. Any of the physical volumes can be used when the target virtual volume is requested. The volume translation apparatus 220 may query the library control system in the data storage library 230 to determine which physical volumes are available. It should be kept in mind, however, that the volume translation apparatus 220 does not require intervention in the data path. By having the volume translation apparatus 220 intervening in the data path, it is possible for additional translation options to be performed, but it is an optional capability rather than a requirement of the present invention.

Once the appropriate physical volumes are present in the media drives 232–238, the volume translation apparatus 220 transmits the data in the I/O request, or reads data from the physical volumes, in accordance with the I/O request. The performance of these I/O operations requires that references to the mounted media and physical volume identifiers in the I/O request data being written to the physical volumes of the secondary virtual volume be translated based on the identified mapping described above.

Thus, the present invention provides an intermediate layer between the host machines and the data storage media for translation of an identified virtual volume to a secondary virtual volume and, ultimately, to the physical volumes associated with the secondary virtual volume. In this way, the applications resident on the host machines may always write or read from the original virtual volume even though the write and read operations may actually be occurring with a different virtual volume. Thus, with the present invention, the burden on the host machines for managing complex mappings of volumes and having to modify I/O requests is relieved.

While FIG. 2A illustrates that the volume mapping modules 222 lie in both the control path 216, 218 and data paths 215, 224 of the communication links between the host machines 210 and the data storage library 230, the present invention is not limited to such. Rather, as shown in FIG. 2B, the functions and operations of the present invention may be performed entirely within the control path 216 and library control path 218. Thus, the data path 215, 224 is not modified by the present invention in this alternative embodiment.

In addition, while FIG. 2A illustrates the volume translation apparatus 220 as a separate device from the host machines 210 and the data storage library 230, the present invention is not limited to such. Rather, the volume translation apparatus 220, or portions thereof, may be integrated into one or more of the host machines 210 and the data storage library 230. For example, the volume translation apparatus 220 may be integrated into a controller of the data storage library 230 without departing from the spirit and scope of the present invention.

Furthermore, while FIG. 2A illustrates the volume translation apparatus 220 as a hardware apparatus, the present invention is not limited to such. Rather, the functions of the volume translation apparatus 220 may be implemented as hardware, software, or any combination of hardware and software. Moreover, as mentioned above, this software and/or hardware may be integrated with one or more of the host machines 210 and the data storage library 230 without departing from the spirit and scope of the present invention.

The volume translation apparatus 220 of the present invention has many applications. For example, the volume translation apparatus 220 may be used to manage replicated data storage media to handle faults with physical volumes, to translate to different media drive types, to translate to different types of data storage media, to translate to different communication medias, and the like.

Figure 3A:
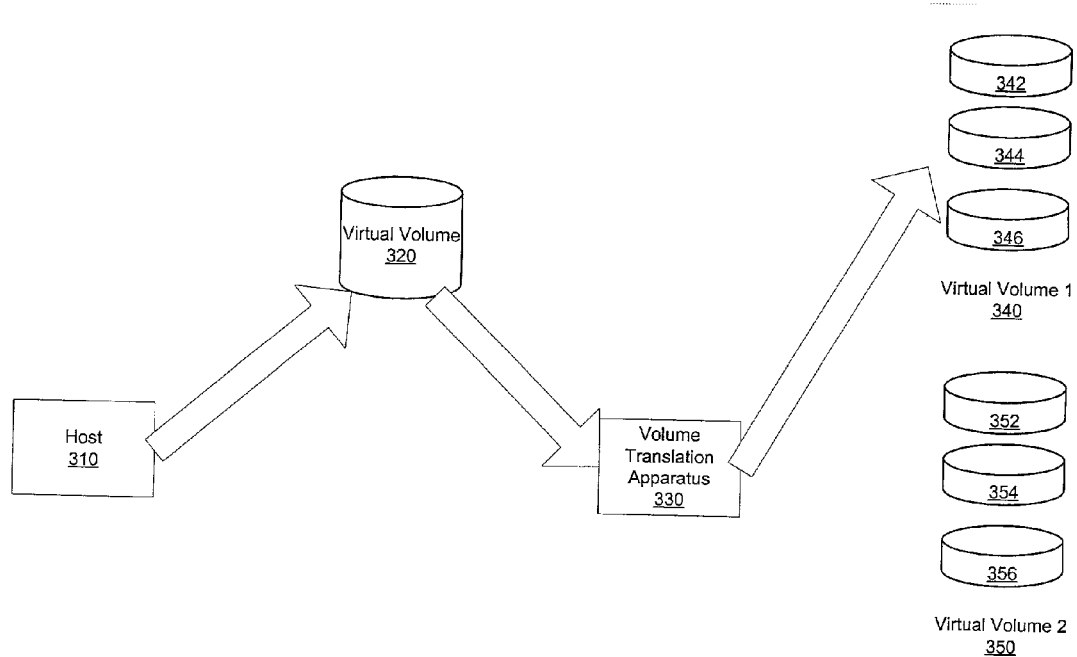
FIGS. 3A and 3B are exemplary diagrams illustrating how the volume translation apparatus redirects input/output operations to a redundant set of physical volumes.
Figure 3B:
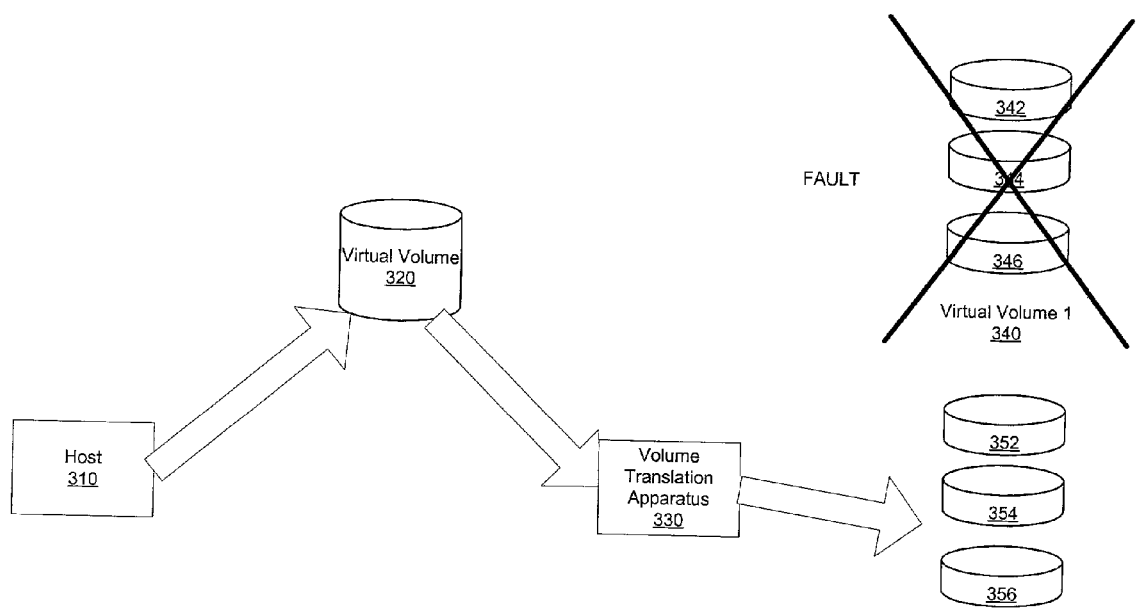

FIGS. 3A and 3B illustrate how the volume translation apparatus may be used for replicated data storage media management and fault handling. In FIGS. 3A and 3B, the virtual volumes 340 and 350 both include a copy of the data being accessed by the host machine 310. In one case, shown in FIG. 3A, the I/O request is directed to virtual volume 340 and in the other, the I/O request is directed to virtual volume 350.

FIG. 3A illustrates a data flow during a normal operation of the data processing system. As shown in FIG. 3A, the host machine 310 issues an I/O request directed to virtual volume 320. The I/O request is received by the volume translation apparatus 330 which maps the I/O request to virtual volume 340 which happens to be the original virtual volume. Thus, the data that is read from or written to virtual volume 320 is in actuality read from or written to one or more of physical volumes 342–346 of virtual volume 340.

As mentioned above, the virtual volumes 340 and 350 both have a copy of the data of virtual volume 320. At some time, a fault occurs in one or more of the physical volumes 342–346 of virtual volume 340. This fault is reported back to the volume translation apparatus 330 which determines that a particular element of the mapping of virtual volume 320, namely the mapping to virtual volume 340, is no longer available. Thus, the mapping, as shown in FIG. 3B, now directs the I/O requests to virtual volume 350 and physical volumes 352–356.

Thus, in both cases, the applications on the host machine direct their I/O requests to virtual volume 320. The actual virtual volume and physical volumes to which the I/O request is sent is transparent to the host machine applications. All of the management of the translation of the virtual volume 320 into physical volumes is done by the volume translation apparatus 330 without burdening the host machine 310.

In addition, replication of the virtual volume 340 is made easy by only requiring copying of the data to another virtual volume 350 and informing the volume translation apparatus 330 of the copy. There is no need for complex management algorithms in the host machine 310 to manage a replication of the virtual volume 340.

Figure 4A:
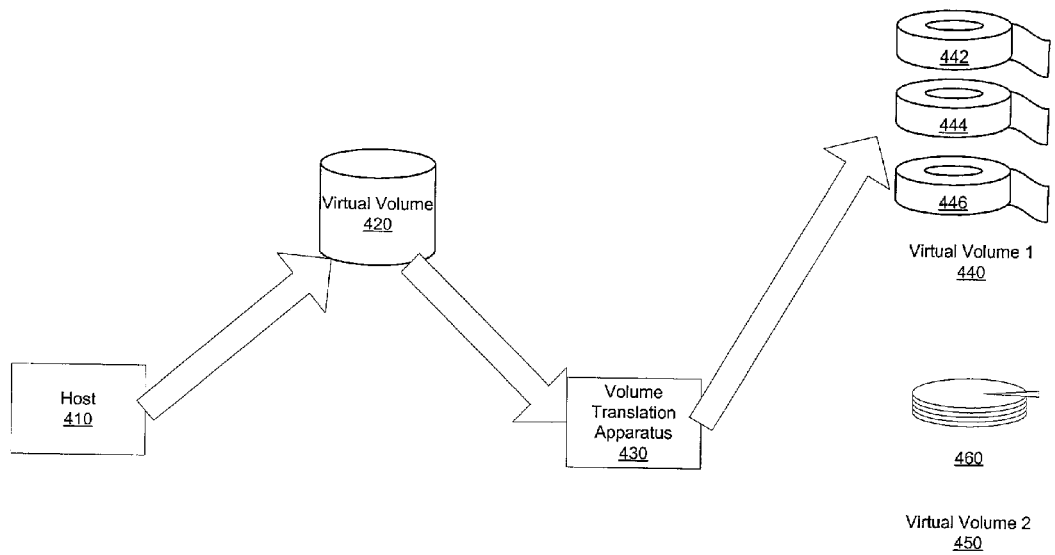
FIGS. 4A and 4B are exemplary block diagrams illustrating a redirection of input/output operations to a redundant set of physical volumes that are of a different media type than the original physical volumes.
Figure 4B:
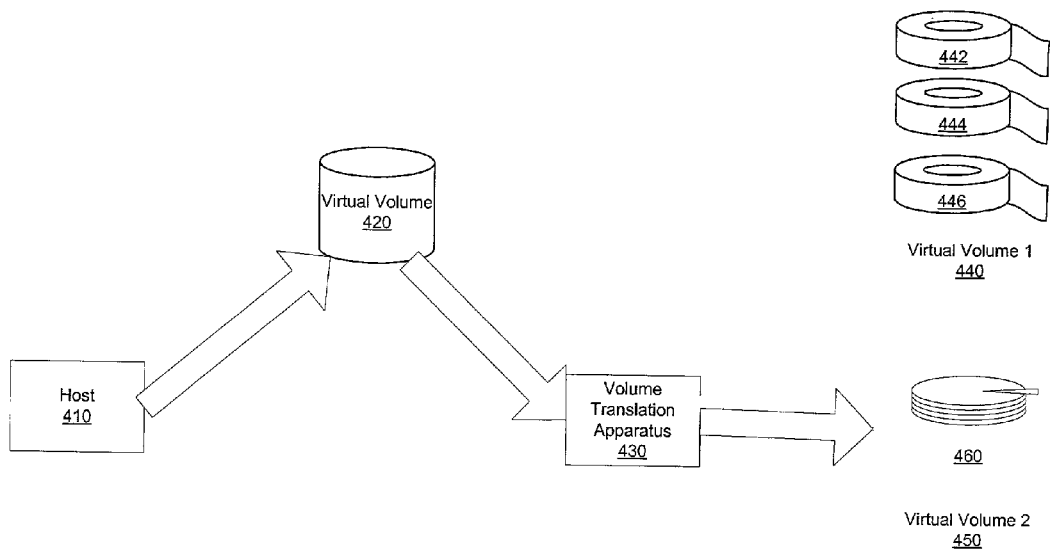

FIGS. 4A and 4B illustrate how the volume translation apparatus of the present invention may be used to translate to different media and different media drives. In FIGS. 4A and 4B, the virtual volumes 440 and 450 both include a copy of the data being accessed by the host machine 410. In one case, shown in FIG. 4A, the I/O request is directed to virtual volume 440 and in the other, the I/O request is directed to virtual volume 450.

As shown in FIG. 4A, the data for virtual volume 420 is originally present on magnetic tape media physical volumes 442–446. It is desired to migrate the virtual volume 420 data to a new type of media, e.g. magnetic hard disk 460. In order to do this, the data from the magnetic tape media physical volumes 442–446 is copied to a physical volume on hard disk 460 such that both virtual volume 440 and virtual volume 460 have copies of the data for virtual volume 420.

In order to access the data on virtual volume 450, the volume translation apparatus 430 is instructed to map I/O requests to virtual volume 420 to virtual volume 450. In so doing, the volume translation apparatus 430 also translates the I/O request into one or more commands suitable for the new media type. This conversion of I/O requests is based on a prior knowledge of the command structures and a mapping between the structure of the I/O request to the known command structures. These commands are then transmitted to the virtual volume 450 where the I/O request is executed on the physical volume 460.

This same methodology may be applied to different types of the same media. That is, there may be different types of magnetic tape media that may be used in a data storage library. These various magnetic tape media may have different characteristics and may make use of different media drives from that of the original physical volumes. The volume translation apparatus 430 may perform a translation of parameters and command syntax based on the particular physical volumes being accessed. In this way, the host machine's applications need not be burdened with having to know how to map between media types.

The present invention, in the simplest case, uses the virtual volume identifier to determine which physical volumes may be substituted, as described previously. For example, the present invention may simply translate one physical volume (tape cartridge) for the requested, or target, virtual volume. When media translation is used with the volume translation apparatus, the volume translation apparatus keeps track of the media type as well as the physical volumes in the mapping tables.

In addition, the volume translation apparatus of the present invention may further be used as a bridge to route between different types of storage networking medias. For example, the host machine 410 may access the volume translation apparatus 430 via a first communication media and the volume translation apparatus 430 may access data on the physical volumes 442–446 and/or 460 via a second communication media different from the first communication media. For example, the host machine 410 may access the volume translation apparatus 430 via a fibre channel communications link and the data may reside on a small computer system interface (SCSI) connected magnetic tape device. The conversion from a first protocol associated with the first communication media to a second protocol associated with the second communication media may be performed by the volume translation apparatus 430 in a similar manner as the mapping from I/O commands for one media type to another media type.

Figure 5:
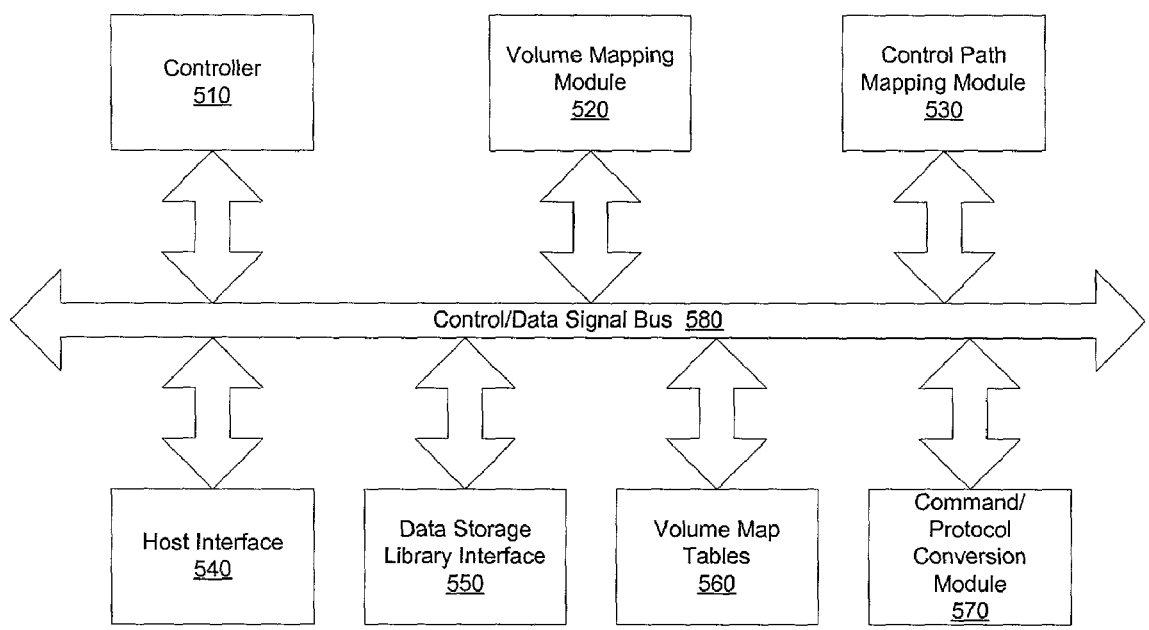
FIG. 5 is an exemplary block diagram of a volume translation apparatus according to the present invention.

FIG. 5 is an exemplary block diagram of a volume translation apparatus according to an exemplary embodiment of the present invention. It should be noted that the elements in FIG. 5 may be implemented as hardware, software, or any combination of hardware and software. If should further be noted that the elements in FIG. 5 may reside in a single device or may be distributed across a plurality of devices in a data processing system.

As shown in FIG. 5, the volume translation apparatus includes a controller 510, a volume mapping module 520, a control path mapping module 530, a host interface 540, a data storage library interface 550, volume map tables 560, and a command/protocol conversion module 570. The elements 510–570 are coupled to one another via the control/data signal bus 580. Although a bus architecture is shown in FIG. 5, the present invention is not limited to such. Rather, any architecture that facilitates the transfer of control/data signals between the elements 510–570 may be used without departing from the spirit and scope of the present invention.

The controller 510 controls the overall operation of the volume translation apparatus and orchestrates the operation of the other elements 520–570. The controller 510 receives an I/O request from a host machine via the host interface 540. The controller 510 then instructs the volume mapping module 520 and the control path mapping module 530 to operate on the virtual volume identified in the received I/O request.

The volume mapping module 520 and the control path mapping module 530 both operate to modify references to the original virtual volume in the I/O request to a secondary virtual volume/physical volumes. The volume mapping module 520 performs a look-up of the secondary virtual volume/physical volumes in the volume map tables 560 based on the original virtual volume identified in the I/O request. This secondary virtual volume/physical volumes identifier is then mapped into references to the original virtual volume in the I/O request data. In addition, the control path mapping module 530 modifies the control information for the I/O request to identify this secondary virtual volume/physical volumes. Moreover, the control path mapping module 530 transmits the control information to the data storage library via the data storage library interface 550 to thereby ensure that the appropriate physical volumes are mounted in the media drives of the data storage library.

The controller 510 then transmits the I/O request to the data storage library via the data storage library interface 550 so that the I/O request is performed on the appropriate physical volumes of the secondary virtual volume. In some cases the transmission of the I/O request may require a conversion of the I/O request to a different command structure and/or communication protocol, as discussed above. In such a case, the controller 510 instructs the command/protocol conversion module 570 to convert the I/O request to the appropriate command and/or protocol syntax before transmitting it to the data storage library.

Figure 6:
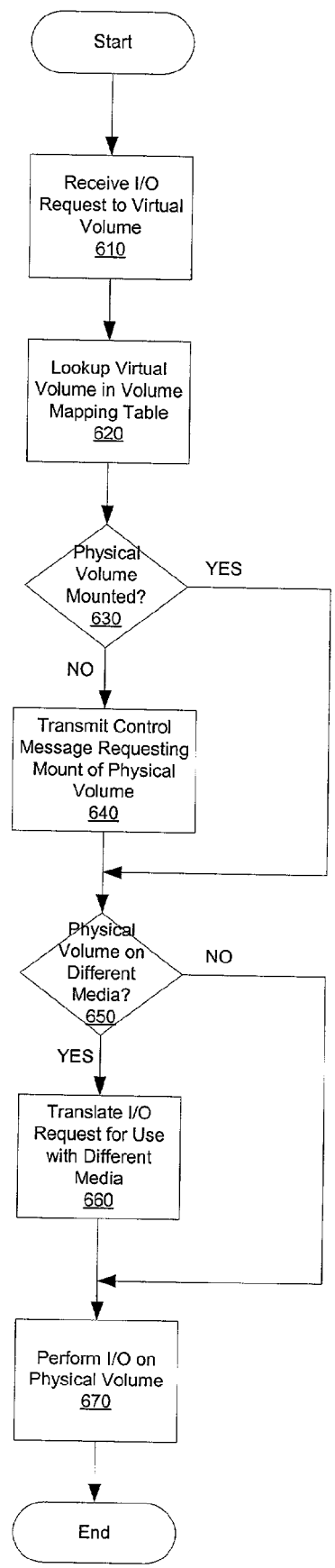
FIG. 6 is a flowchart outlining an exemplary operation of the present invention.

FIG. 6 is a flowchart outlining an exemplary operation of the present invention. As shown in FIG. 6, the operation starts with receipt of an I/O request directed to an original virtual volume (step 610). A secondary virtual volume is identified by looking up the original virtual volume in a volume mapping table (step 620).

A determination is then made as to whether the physical volumes associated with the secondary virtual volume are mounted (step 630). If so, the operation proceeds to step 650. Otherwise, a control message is transmitted to the data storage library requesting that the physical volumes be mounted in the media drives (step 640).

A determination is then made as to whether the physical volumes are a different media (or in some embodiments whether a different communication protocol is necessary) (step 650). If not, the operation proceeds to step 670. If they are a different media (or communication protocol), the I/O request is translated for use with the different media (or communication protocol) (step 660). Thereafter, the I/O request is performed on the physical volumes associated with the secondary virtual volume (step 670) and the operation ends.

Thus, the present invention provides a mechanism by which the burden of maintaining and managing information regarding copies of virtual volume data is appreciably reduced. Furthermore, this burden is shifted from the host devices to an intermediate layer between the host devices and the data storage media. In this way, the host devices may continue to perform I/O operations to the same virtual volume even though the data being accessed is actually on a different virtual volume or different set of physical volumes from that known to the host devices. This greatly simplifies the process of creating and managing copies of virtual volume data.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of managing copies of virtual volume data, comprising:
    receiving an access request directed to an original virtual volume, wherein the original virtual volume is associated with one or more original physical volumes contained on a first type of data storage media;
    mapping the access request to a secondary virtual volume; and
    performing the access request on one or more physical volumes associated with the secondary virtual volume contained on a second type of data storage media.

2. The method of claim 1, wherein the original virtual volume is associated with one or more original physical volumes, and wherein the one or more original physical volumes are the same as the one or more physical volumes.

3. The method of claim 1, wherein the first type of data storage media and the second type of data storage media is one of magnetic tape media, magnetic disk media, optical media, floppy diskettes, CD-ROM media, DVD-ROM media, random access memory (RAM), and memory card media.

4. The method of claim 1, wherein mapping the access request to a secondary virtual volume includes redirecting the access request from a first secondary virtual volume to a second secondary virtual volume.

5. The method of claim 4, wherein the access request is redirected in response to a fault in a physical volume of the first secondary virtual volume.

6. The method of claim 4, wherein the access request is redirected in response to a command to redirect the access request to the second secondary virtual volume.

7. The method of claim 4, wherein the first secondary virtual volume includes physical volumes on a first media type and the second secondary virtual volume includes physical volumes on a second media type.

8. The method of claim 7, wherein performing the access request on one or more physical volumes associated with the secondary virtual volume includes converting the access request to a format suitable for the second media type.

9. The method of claim 1, wherein the access request is received using a first communication protocol and wherein performing the access request on one or more physical volumes associated with the secondary virtual volume includes converting the access request from the first communication protocol to a second communication protocol.

10. An apparatus for managing copies of virtual volume data, comprising:
    means for receiving an access request directed to an original virtual volume, wherein the original virtual volume is associated with one or more original physical volumes contained on a first type of data storage media;
    means for mapping the access request to a secondary virtual volume; and means for performing the access request on one or more physical volumes associated wit the secondary virtual volume contained on a second type of data storage media.

11. The apparatus of claim 10, wherein the original virtual volume is associated with one or more original physical volumes, and wherein the one or more original physical volumes are the same as the one or more physical volumes.

12. The apparatus of claim 10, wherein the first type of data storage media and the second type of data storage media is one of magnetic tape media, magnetic disk media, optical media, floppy diskettes, CD-ROM media, DVD-ROM media, random access memory (RAM), and memory card media.

13. The apparatus of claim 10, wherein the means for mapping the access request to a secondary virtual volume includes means for redirecting the access request from a first secondary virtual volume to a second secondary virtual volume.

14. The apparatus of claim 13, wherein the access request is redirected in response to a fault in a physical volume of the first secondary virtual volume.

15. The apparatus of claim 13, wherein the access request is redirected in response to a command to redirect the access request to the second secondary virtual volume.

16. The apparatus of claim 13, wherein the first secondary virtual volume includes physical volumes on a first media type and the second secondary virtual volume includes physical volumes on a second media type.

17. The apparatus of claim 16, wherein the means for performing the access request on one or more physical volumes associated with the secondary virtual volume includes means for converting the access request to a format suitable for the second media type.

18. The apparatus of claim 10, wherein the access request is received using a first communication protocol and wherein the means for performing the access request on one or more physical volumes associated with the secondary virtual volume includes means for convening the access request from the first communication protocol to a second communication protocol.

19. A computer program product in a computer readable medium for managing copies of virtual volume data, comprising:

first instructions for receiving an access request directed to an original virtual volume, wherein the original virtual volume is associated with one or more original physical volumes contained on a first type of data storage media;

second instructions for mapping the access request to a secondary virtual volume; and third instructions for performing the access request on one or more physical volumes associated with the secondary virtual volume contained on a second type of data storage media.

20. The computer program product of claim 19, wherein the original virtual volume is associated with one or more original physical volumes, and wherein the one or more original physical volumes are the same as the one or more physical volumes.

21. The computer program product of claim 19, wherein the first type of data storage media and the second type of data storage media is one of magnetic tape media, magnetic disk media, optical media, floppy diskettes, CD-ROM media, DVD-ROM media, random access memory (RAM), and memory card media.

22. The computer program product of claim 19, wherein the second instructions for mapping the access request to a secondary virtual volume include instructions for redirecting the access request from a first secondary virtual volume to a second secondary virtual volume.

23. The computer program product of claim 22, wherein the access request is redirected in response to a fault in a physical volume of the first secondary virtual volume.

24. The computer program product of claim 22, wherein the access request is redirected in response to a command to redirect the access request to the second secondary virtual volume.

25. The computer program product of claim 22, wherein the first secondary virtual volume includes physical volumes on a first media type and the second secondary virtual volume includes physical volumes on a second media type.

26. The computer program product of claim 25, wherein the third instructions for performing the access request on one or more physical volumes associated with the secondary virtual volume include instructions for converting the access request to a format suitable for the second media type.

27. The computer program product of claim 19, wherein the access request is received using a first communication protocol and wherein the third instructions for performing the access request on one or more physical volumes associated with the secondary virtual volume include instructions for converting the access request from the first communication protocol to a second communication protocol.

* * * * *